United States Patent
Arumugam et al.

(12) 
(10) Patent No.: US 11,484,953 B2
(45) Date of Patent: Nov. 1, 2022

(54) TOOL HOLDER WITH POCKET FOR ACCOMMODATING CUTTING INSERTS WITH DIFFERENT CLEARANCE ANGLES

(71) Applicant: KENNAMETAL INDIA LIMITED, Bangalore (IN)

(72) Inventors: Bharath Arumugam, Bangalore (IN); Padmakumar Muthuswamy, Bangalore (IN)

(73) Assignee: KENNAMETAL INDIA LIMITED, Bangalore (IN)

(*) Notice: Subject to any disclaimer, the term of this patent is extended or adjusted under 35 U.S.C. 154(b) by 243 days.

(21) Appl. No.: 16/905,173

(22) Filed: Jun. 18, 2020

(65) Prior Publication Data
US 2020/0398352 A1 Dec. 24, 2020

(30) Foreign Application Priority Data
Jun. 20, 2019 (IN) .............................. 201941024553

(51) Int. Cl.
B23C 5/22 (2006.01)
B23C 5/20 (2006.01)

(52) U.S. Cl.
CPC ............ *B23C 5/202* (2013.01); *B23C 5/2208* (2013.01); *B23C 2200/0455* (2013.01); *B23C 2200/165* (2013.01); *B23C 2210/168* (2013.01)

(58) Field of Classification Search
CPC ... B23C 5/109; B23C 5/2472; B23C 2210/16; B23C 5/2213; B23C 2200/0411; B23C 2200/0455; B23C 2210/168; B23C 5/06; B23C 5/202; B23C 5/2208; B23C 2200/165
See application file for complete search history.

(56) References Cited

U.S. PATENT DOCUMENTS

| 4,182,587 A | 1/1980 | Striegl |
| 4,648,755 A | 3/1987 | Stashko |

(Continued)

FOREIGN PATENT DOCUMENTS

| DE | 274995 | 3/1913 |
| DE | 274995 | 1/1990 |

(Continued)

OTHER PUBLICATIONS

May 7, 2021 Office Action (non-US) DE App. No. 102020115518A1.

*Primary Examiner* — Sara Addisu
(74) *Attorney, Agent, or Firm* — Larry R. Meenan

(57) ABSTRACT

A toolholder (10) has a pocket (20) that accommodates two styles of cutting inserts (25, 25') having different clearance angles (CA). A support pad (78, 80) protrudes from two side walls (82, 84) of the pocket (20). Each support pad (78, 80) includes a first, planar wall (78a, 80a) and a second, planar wall (78b, 80b) formed at a composite angle defined by a first angle (92) and a second angle (94). The first, planar wall (78a, 80a) enables the pocket (20) to accommodate the second style of cutting insert (25'), and the second, planar wall (78b, 80b) enables the pocket (20) to accommodate the first style of cutting insert (25). In one aspect, the support pads (78, 80) extend the entire length, L, of the support pad (78, 80). In another aspect, an indentation (112, 114) divides one or both of the support pads (178, 180) into two portions, each portion having two planar walls (178a, 178b, 178c, 178d, 180a, 180b, 180c, 180d).

19 Claims, 9 Drawing Sheets

(56) References Cited

U.S. PATENT DOCUMENTS

| | | | |
|---|---|---|---|
| 4,844,666 A | 7/1989 | Tsujimura et al. | |
| 5,083,887 A | 1/1992 | Dotany | |
| 5,762,452 A | 6/1998 | Mina | |
| 5,913,644 A | 6/1999 | DeRoche | |
| 6,004,081 A * | 12/1999 | Hellstrom | B23C 5/2213 407/103 |
| 6,152,658 A * | 11/2000 | Satran | B23B 27/00 407/120 |
| 6,508,612 B1 | 1/2003 | Baca | |
| 6,976,811 B1 | 12/2005 | DeRoche et al. | |
| 7,179,021 B2 * | 2/2007 | Shaheen | B23B 27/1644 407/107 |
| 7,255,518 B2 * | 8/2007 | Wallstrom | B23B 27/1662 407/103 |
| 8,282,320 B2 | 10/2012 | Hartlohner et al. | |
| 8,454,277 B2 * | 6/2013 | Dudzinsky | B23C 5/2204 407/103 |
| 8,454,278 B2 | 6/2013 | Hartlohner et al. | |
| 9,409,240 B2 * | 8/2016 | Matsubara | B23C 5/2213 |
| 9,475,131 B2 * | 10/2016 | Waggle | B23C 5/003 |
| 11,338,373 B2 * | 5/2022 | Hayakawa | B23C 5/22 |
| 2001/0041105 A1 | 11/2001 | Hansson et al. | |
| 2005/0084341 A1 | 4/2005 | Long | |
| 2005/0089379 A1 | 4/2005 | Francis et al. | |
| 2008/0019783 A1 | 1/2008 | Pantzar | |
| 2008/0304924 A1 * | 12/2008 | Engstrom | B23C 5/2213 407/35 |
| 2009/0169313 A1 * | 7/2009 | Satran | B23C 5/2213 407/42 |
| 2011/0293381 A1 * | 12/2011 | Saji | B23C 5/109 407/120 |
| 2013/0129432 A1 * | 5/2013 | Jaeger | B23C 5/2247 407/42 |
| 2013/0216319 A1 | 8/2013 | Michelet et al. | |
| 2014/0161544 A1 | 6/2014 | Morandeau, Sr. et al. | |
| 2015/0016900 A1 * | 1/2015 | Jansson | B23C 5/2213 407/66 |
| 2015/0298223 A1 * | 10/2015 | Kumoi | B23C 5/2208 407/102 |
| 2015/0336187 A1 * | 11/2015 | Choi | B23C 5/06 407/113 |
| 2016/0214186 A1 * | 7/2016 | Mura | B23C 5/109 |
| 2017/0189974 A1 | 7/2017 | Otsuka | |
| 2017/0197257 A1 | 7/2017 | Aso | |
| 2017/0320146 A1 * | 11/2017 | Ahnfeldt | B23C 5/109 |
| 2017/0326656 A1 * | 11/2017 | Saji | B23C 5/109 |
| 2018/0036811 A1 * | 2/2018 | Saji | B23C 5/202 |
| 2018/0071840 A1 | 3/2018 | Suzuki et al. | |
| 2019/0255622 A1 * | 8/2019 | Hecht | B23B 29/12 |
| 2020/0254540 A1 * | 8/2020 | Elkayam | B23C 5/109 |

FOREIGN PATENT DOCUMENTS

| | | |
|---|---|---|
| DE | 69619378 T2 | 10/2002 |
| DE | 10308037 A1 | 9/2004 |
| DE | 60310551 T2 | 4/2007 |
| DE | 112014006093 T5 | 10/2016 |
| EP | 2614907 | 11/2016 |
| JP | 61199314 U1 | 12/1986 |
| JP | 04183512 | 6/1992 |
| JP | 10008211 | 1/1998 |
| JP | 11000035 U | 3/1999 |
| JP | 2012020394 | 2/2012 |
| WO | WO2013037475 A1 | 3/2013 |
| WO | WO2016085150 A1 | 6/2016 |

* cited by examiner

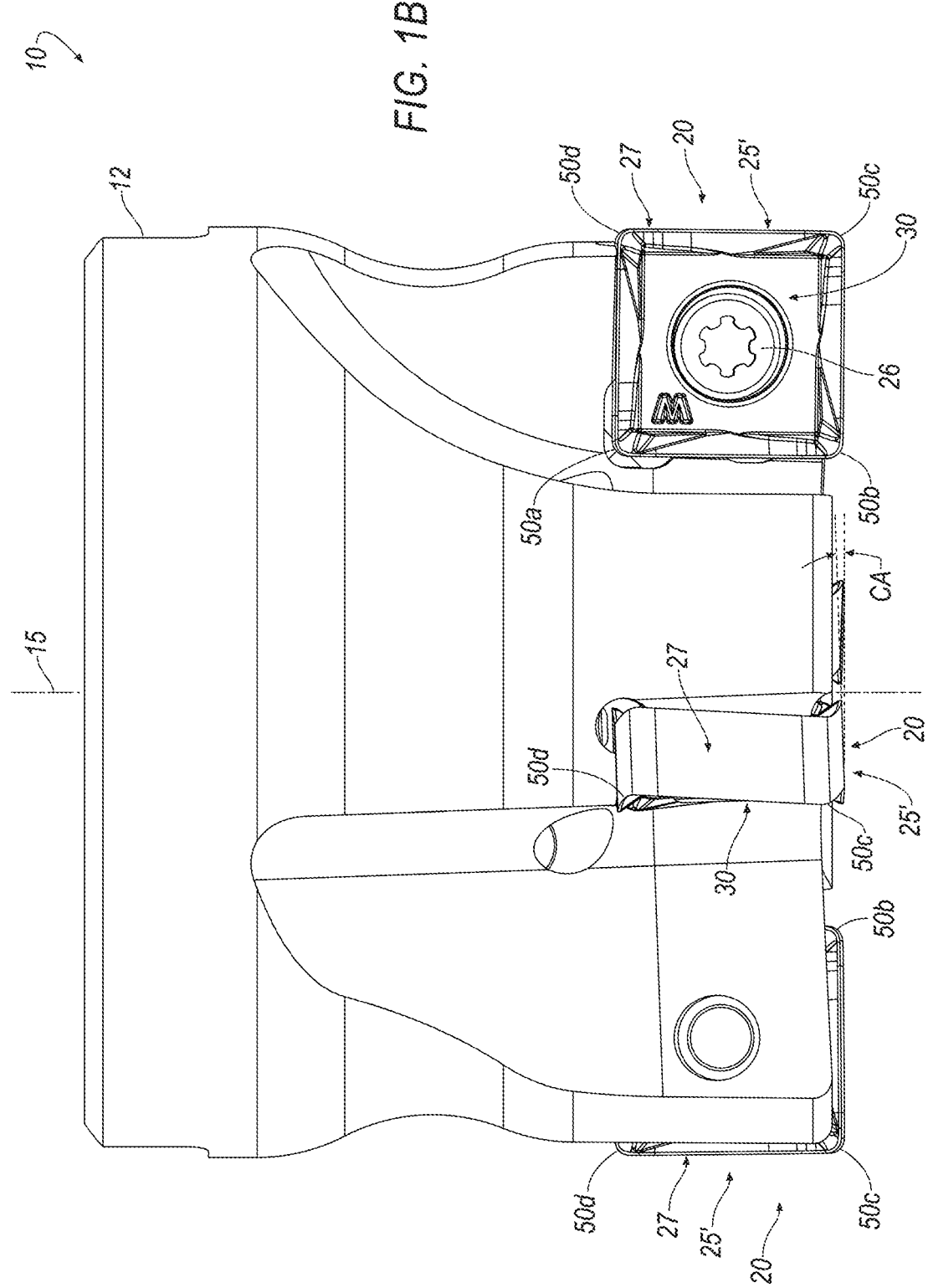

TOOL HOLDER WITH POCKET FOR ACCOMMODATING CUTTING INSERTS WITH DIFFERENT CLEARANCE ANGLES

RELATED APPLICATION DATA

The present application claims priority pursuant to 35 U.S.C. § 119(a) to Indian Patent Application Number 201941024553 filed Jun. 20, 2019, which is incorporated herein by reference in its entirety.

FIELD

The invention pertains to the field of rotary cutting tools. More particularly, the invention pertains to a rotary cutting tool with an insert pocket that can accommodate both positive and negative (neutral) style cutting inserts.

BACKGROUND

The invention pertains to the field of rotary cutting tools. More particularly, the invention pertains to a rotary cutting tool with an insert pocket that can accommodate both positive and negative (neutral) style cutting inserts.

Milling cutters for milling operations are well known. Such milling cutters typically comprise a cutter body, which is a generally circular shaped ring having a plurality of pockets in an outer periphery thereof. A cutting insert is secured in each pocket. Each cutting insert comprises a body and at least one cutting edge. The body is secured directly in the pocket or to a cartridge, which is secured in the pocket.

Tangential cutting inserts are known from the prior art. The tangential cutting insert has two opposite, similar and substantially square bottom surfaces, which are rotated with respect to one another. Formed along the outer peripheries of the bottom surfaces are four similar side surfaces. In each case, one main cutting edge is formed at the transition from each side surface to the two bottom surfaces. Formed at the transition between adjacent side surfaces are secondary cutting edges, which merge into the respective main cutting edge by a corner radius. A plurality of cutting edges are formed that are available for cutting a material to be machined.

A cutting insert with a high clearance angle (i.e., a positive style cutting insert) is preferred when machining certain types of materials, such as high temperature alloy material, and the like. However, spring back has occurred when attempts have been made to mount a negative (neutral) cutting insert with a smaller clearance angle in a toolholder designed for a positive style cutting insert. Thus, in the past, it has been necessary to mount a positive style cutting insert in one type of toolholder and a negative (neutral) style cutting insert in a different type of toolholder. Unfortunately, this increases the cost because two different types of toolholders are required.

Accordingly, there is a need in the art for a toolholder that is capable of accommodating both positive and negative style cutting inserts.

SUMMARY

The problem of mounting both positive and negative (neutral) style cutting inserts to the same toolholder is solved by providing seating pads on the side surfaces of the pocket that has a first angled surface for a first cutting insert and has a second angled surface for a second cutting insert having a different clearance angle than the first cutting insert.

In one aspect of the invention, a toolholder comprises a body extending along a longitudinal axis and having a first end. A pocket extends into the first end, wherein the pocket has a first side wall, a second side wall and a bottom floor for accommodating the cutting insert and, wherein the two sides intersect to define a pocket corner. A support pad extends from each of the first and second side walls of the pocket. Each support pad includes a first, planar wall extending entirely across a length, L, of the support pad, and a second, planar wall adjacent the first wall and extending entirely across the length, L, of the support pad. The second, planar wall is a composite angle comprising a first angle defined by rotating a plane, P, perpendicular to the bottom floor about a vertical axis (i.e., y-axis) and a second angle defined by tilting the plane (P) about the longitudinal axis, the second angle being different in magnitude than the first angle. The first, planar wall of each support pad accommodates a first cutting insert, and the second, planar wall of each support pad accommodates a second cutting insert having a different clearance angle than the first cutting insert.

In another aspect of the invention, a toolholder comprises a body extending along a longitudinal axis and having a first end. A pocket extends into the first end, wherein the pocket has a first side wall, a second side wall and a bottom floor for accommodating the cutting insert and, wherein the two sides intersect to define a pocket corner. A first support pad extending from the first side wall of the pocket and a second support pad extending from the second side wall of the pocket. At least one the first and second support pads includes an indentation defining a first, planar wall, a second planar wall, a third, planar wall and a fourth, planar wall. The second, planar wall and the fourth, planar wall are formed at a composite angle comprising a first angle defined by rotating a plane, P, perpendicular to the bottom floor about a vertical axis (i.e., y-axis) and a second angle defined by tilting the plane (P) about the longitudinal axis, the second angle being different in magnitude than the first angle. The first, planar wall and the third, planar wall of the at least one support pad accommodates a first cutting insert and the second, planar wall and the fourth, planar wall of the at least one support pad accommodates a second style of cutting insert having a different clearance angle than the first cutting insert.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

FIG. 1B is a side view of the toolholder of the invention with pockets for accommodating both positive and negative style cutting inserts with a negative (neutral) style of cutting insert mounted therein;

DETAILED DESCRIPTION

Figure 1A:
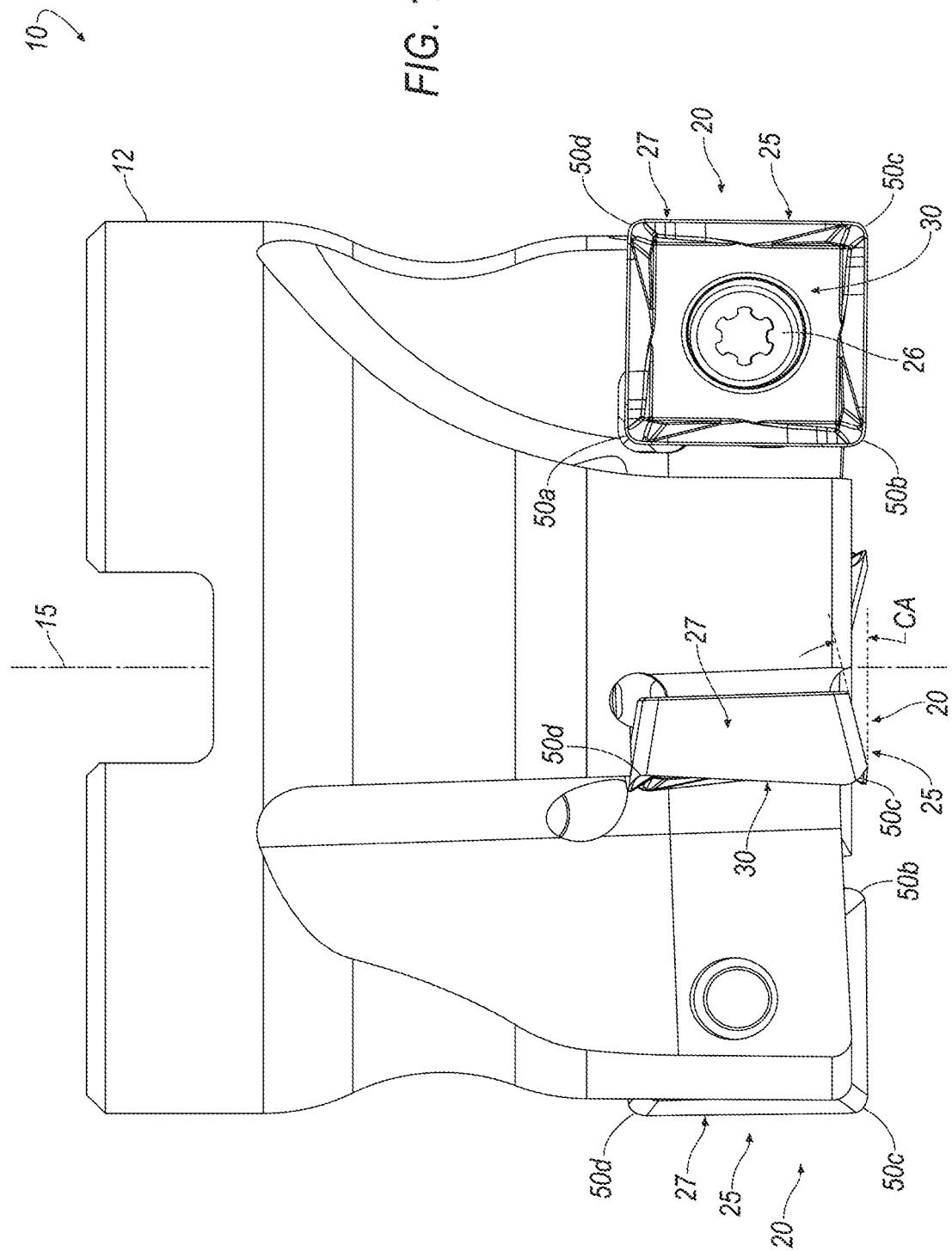
FIG. 1A is a side view of a toolholder of the invention with pockets for accommodating both positive and negative style cutting inserts with a positive style of cutting insert mounted therein.

Referring now to FIG. 1, a side view of a toolholder with pockets for accommodating both positive and negative style cutting inserts with both styles of cutting inserts mounted therein, is shown according to an aspect of the invention.

The description herein of specific applications should not be a limitation on the scope and extent of the use of a toolholder or a cutting insert.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Throughout the text and the claims, use of the word "about" in relation to a range of values (e.g., "about 22 to 35 wt %") is intended to modify both the high and low values recited, and reflects the penumbra of variation associated with measurement, significant figures, and interchangeability, all as understood by a person having ordinary skill in the art to which this invention pertains.

For purposes of this specification (other than in the operating examples), unless otherwise indicated, all numbers expressing quantities and ranges of ingredients, process conditions, etc are to be understood as modified in all instances by the term "about". Accordingly, unless indicated to the contrary, the numerical parameters set forth in this specification and attached claims are approximations that can vary depending upon the desired results sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Further, as used in this specification and the appended claims, the singular forms "a", "an" and "the" are intended to include plural referents, unless expressly and unequivocally limited to one referent.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements including that found in the measuring instrument. Also, it should be understood that any numerical range recited herein is intended to include all sub-ranges subsumed therein. For example, a range of "1 to 10" is intended to include all sub-ranges between and including the recited minimum value of 1 and the recited maximum value of 10, i.e., a range having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

In the following specification and the claims, a number of terms are referenced that have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

As shown in FIG. 1A, the toolholder 10 has a body 12 extending along a longitudinal axis 15 and an axial, forward end 17 with a plurality of pockets 20 extending about the perimeter of the toolholder body 12. A positive style cutting insert 25 having a first clearance angle, CA, is mounted within each of the pockets 20. In the illustrated embodiment, the positive style cutting insert 25 is an on-edge cutting insert, wherein the major cutting edges are located on the end surfaces 27, as opposed to the side surfaces 30 of the cutting insert 25. However, it should be appreciated that the invention is not limited by the type of cutting insert, and that the principles of the invention can be applied to any desirable type of cutting insert.

As shown in FIG. 1B, the toolholder 10 has a body 12 extending along a longitudinal axis 15 and an axial, forward end 17 with a plurality of pockets 20 extending about the perimeter of the toolholder body 12. A negative (neutral) style cutting insert 25' having a clearance angle, CA, is mounted within each of the pockets 20. Similar to the positive style cutting insert 25, the negative style cutting insert 25' is an on-edge cutting insert, wherein the major cutting edges are located on the end surfaces 27, as opposed to the side surfaces 30 of the cutting insert 25.

As shown in FIG. 1A, the positive style cutting insert 25 has a larger clearance angle, CA, between the side wall and the workpiece than the negative (neutral) style cutting insert 25', as shown in FIG. 1B.

Figure 2A:
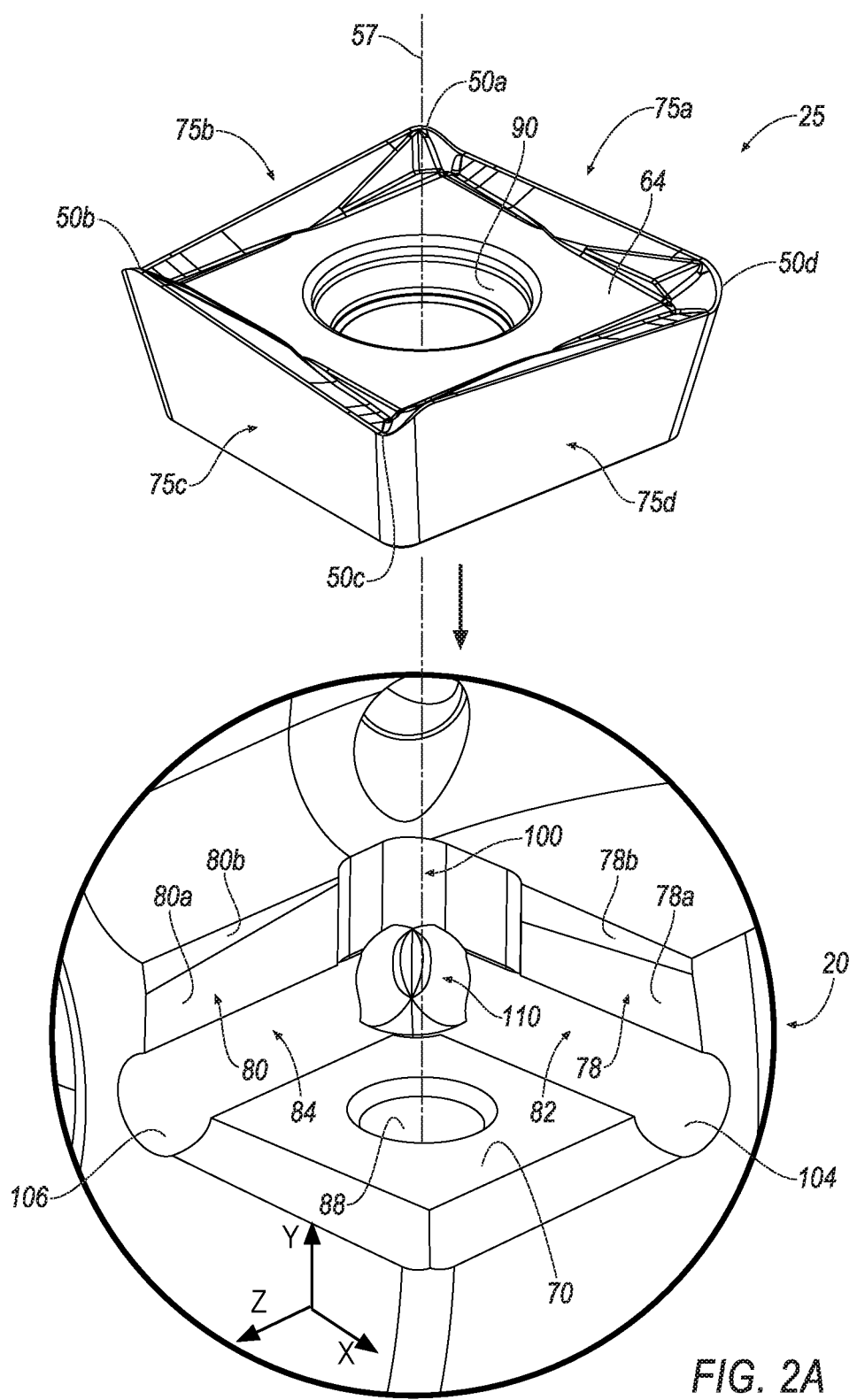
FIG. 2A is an exploded view showing the positive style cutting insert and the pocket of the toolholder with support pads of the invention.
Figure 2B:
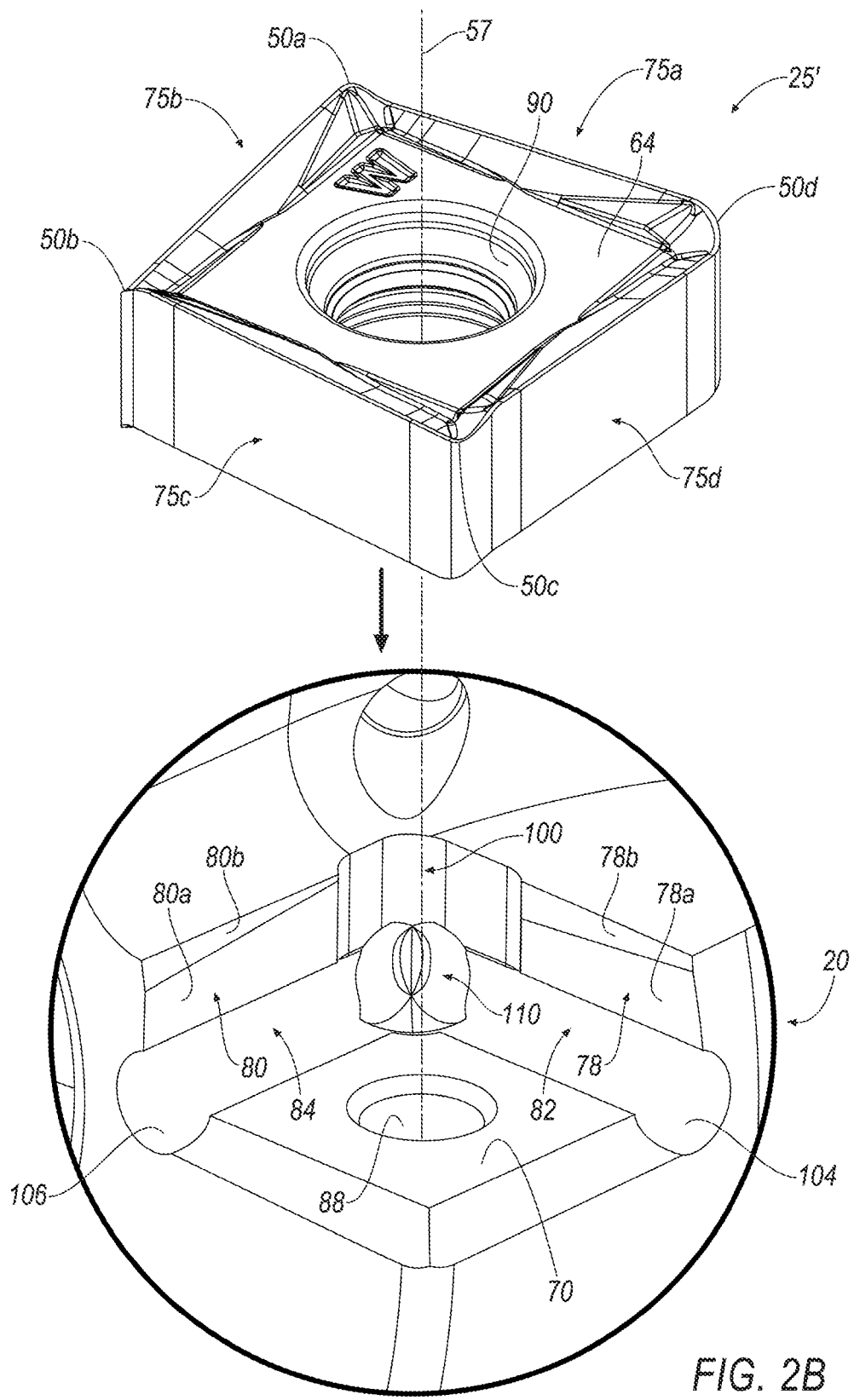
FIG. 2B is an exploded view showing the negative style cutting insert and the pocket of the toolholder with support pads of the invention.

Referring now to FIGS. 2A and 2B, the positive style cutting insert 25 and the negative style cutting insert 25' supported within the pocket 20 at three or more locations or points of contact. The first location is a flat surface, identical to flat surface 64, but on the opposite side of the insert, which rests against a pocket floor 70 of the pocket 20. The other two locations are support pads 78, 80 protruding from the first side wall 82 and the second side wall 84 of the pocket 20, respectively, that contact at least two of the four mounting surfaces 75a, 75b, 75c, 75d of the cutting insert 25, 25'. The support pad 80 may also be referred to as the radial support pad because it supports radial forces and determines the diameter of the toolholder 10. Additionally, support pad 78 may be referred to as the axial support pad because it supports axial forces and determines the heights of the toolholder 10.

The pocket 20 has the general three-dimensional shape of the cutting insert 25 intended to be held therein. To this end, the two side walls 82, 84 intersect to define a pocket corner 86. The pocket corner 86 may include a primary deep relief area 100 and a primary shallow relief area 110 to provide adequate clearance for the corners 50a, 50b, 50c, 50d of the cutting insert 25, 25'. In addition, the pocket 20 may include recesses 104, 106 adjacent the radial support pad 78 and the axial support pad 80, respectively, to provide additional clearance for the cutting insert 25, 25'.

As discussed, the support surfaces in the pocket 20 for the cutting insert 25, 25' are the pocket floor 70, the axial support pad 78, and the radial support pad 80. The majority of the force produced during a machining operation when the toolholder 10 is a milling cutter illustrated in FIGS. 1A, 1B is transmitted through the corner 50c of the cutting insert 25, 25' to the radial support pad 78 and secondary forces are transmitted to the axial support pad 80.

It should be noted that there is a threaded bore 88 within the floor 70 of the pocket 20 to accept a retaining insert screw 26 (FIGS. 1A, 1B) which passes through the central bore 90 of the cutting insert 25, 25'. In general, the insert screw 26 is intended to align the cutting insert 25, 25' within the pocket 20 about a central axis 57 and is not intended to absorb significant forces caused by the metalworking operation. As a result, the large majority of the forces produced during the cutting operation are applied to the support pads 78, 80 and, it is very important that each of these support pads 78, 80 contact the associated mounting surface 75a, 75b on the cutting insert 25, 25' with as much surface area as possible. Worded differently, it is important for the two support pads 78, 80 to be as long as possible, while at the same time providing the necessary clearance to the insert corners, such as corners 50a-d, of the cutting insert 25, 25'.

Directing attention to FIGS. 2A and 2B, one aspect of the invention is that the support pads 78, 80 are capable of accommodating both the positive style cutting insert 25 (FIG. 2A) and the negative (neutral) style cutting insert 25' (FIG. 2B). This is accomplished by incorporating a first, planar wall 78a and a second, planar wall 78b in the support pad 78, and a first, planar wall 80a and a second, planar wall 80b in the support pad 80. In particular, the first walls 78a, 80a of the support pads 78, 80 are substantially perpendicular to the bottom floor 70 to accommodate the negative (neutral) style cutting insert 25', while the second walls 78b, 80b are formed at a composite angle to accommodate the positive style cutting insert 25, thereby eliminating the need for a different toolholder for each style of cutting insert.

As mentioned above, the positive style cutting insert 25 has a larger clearance angle between the side wall and the workpiece than the negative (neutral) style cutting insert 25', as shown in FIG. 1B. Referring back to FIGS. 3-5, in order for the mounting surfaces 75a, 75b of a positive style cutting insert 25 to engage the second walls 78b, 80b, the second walls 78b, 80b of the support pads 78, 80 are formed at a composite angle comprising a first angle 92 with respect to a plane, P, that is perpendicular to the bottom floor 70 of the pocket 20 and a second angle 94 with respect to the plane, P, as shown in FIGS. 3-5. The first angle 92 is defined by rotating the plane, P, in a clockwise direction about the vertical axis (i.e., y-axis in FIG. 2A), and the second angle 94 is formed by tilting the plane, P, in a clockwise direction about the longitudinal axis 15 (i.e., z-axis in FIG. 2A). In this manner, second walls 78b, 80b are formed with a composite angle comprising the first angle 92 and the the second angle 94 to accommodate the clearance angle and the lead correction angle of the positive style cutting insert 25 on the plane, P, perpendicular to the bottom floor 70 (i.e., the y-z plane in FIG. 2A).

Figure 3:
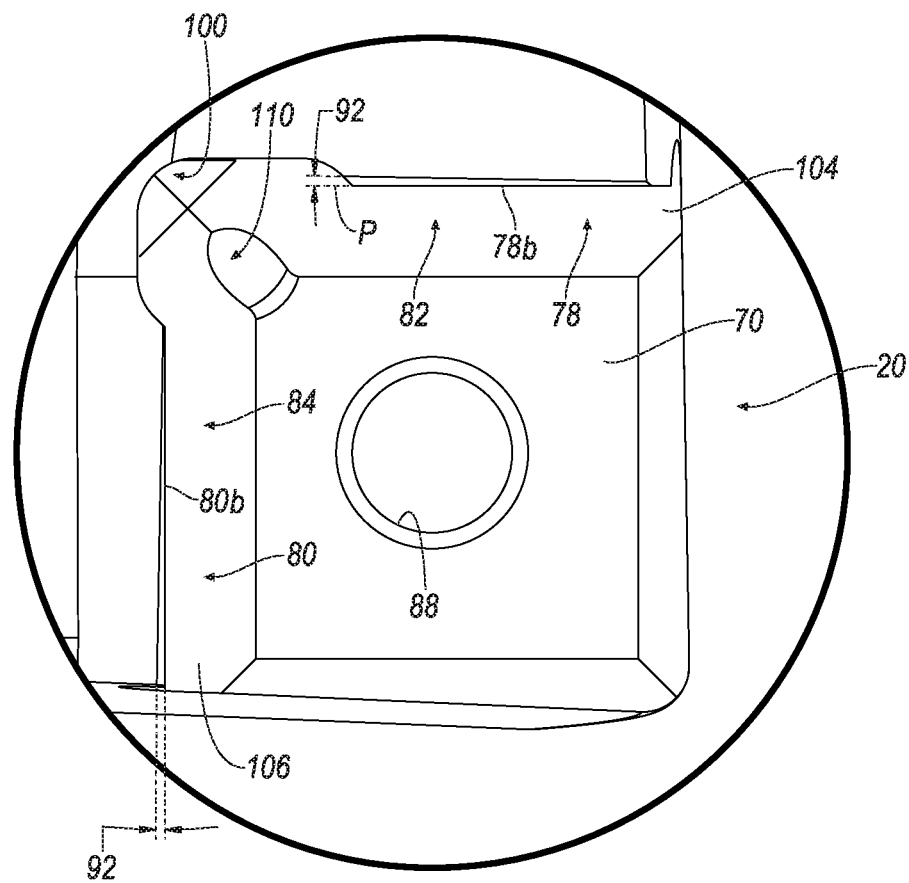
FIG. 3 is a top view of the pocket showing the angle formed by a first, planar wall of the support pads of the invention.
Figure 4:
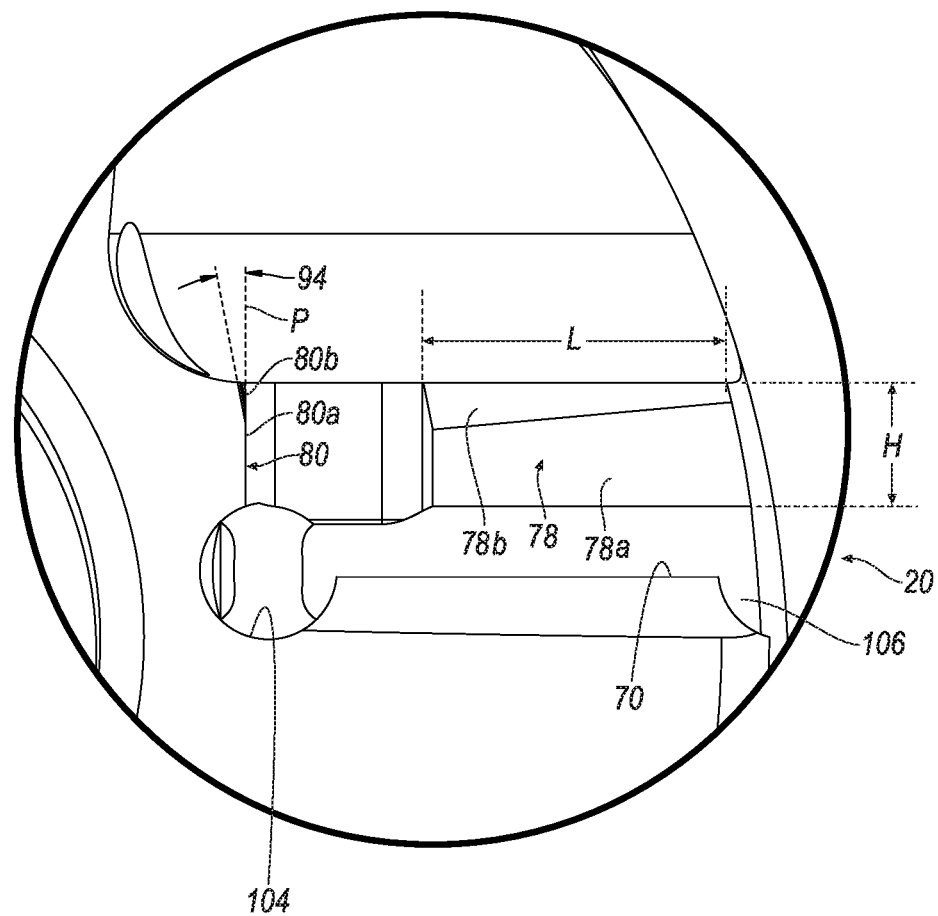
FIG. 4 is a side view of the pocket showing the angle formed by a second, planar wall of one of the support pads of the invention when viewed along a plane parallel to the pocket floor.
Figure 5:
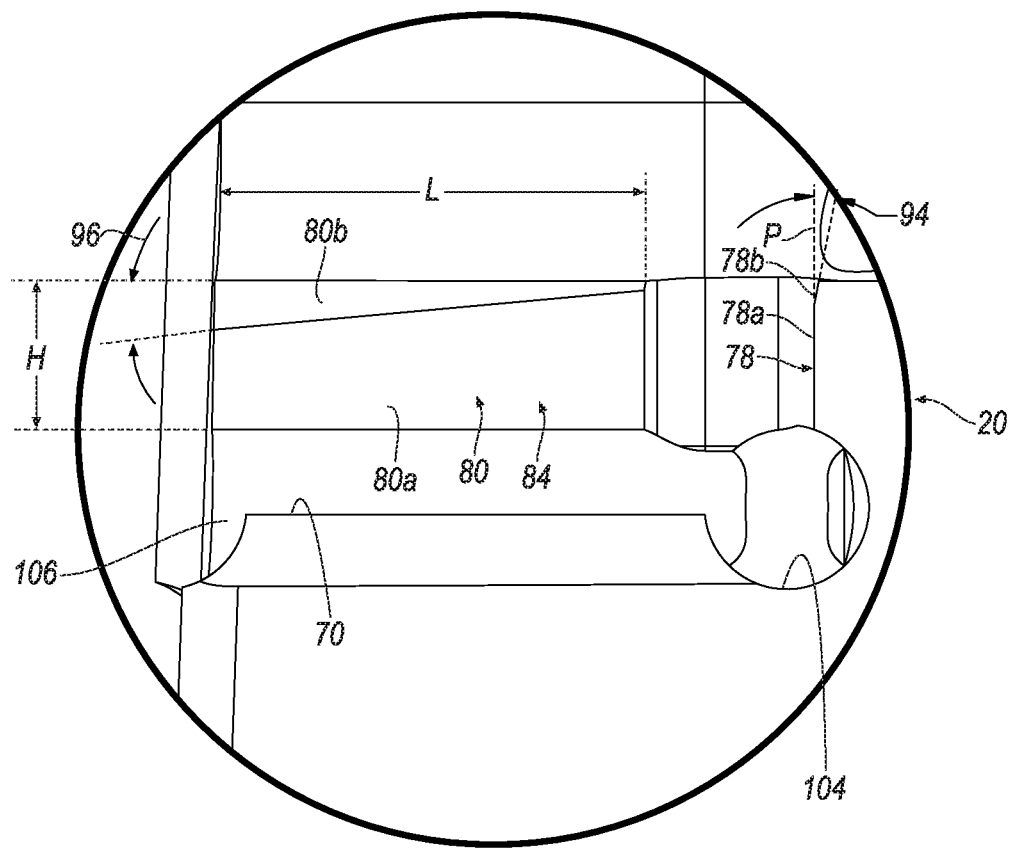
FIG. 5 is a side view of the pocket showing the angle formed by a second, planar wall of the other one of the support pads of the invention when viewed along a plane parallel to the pocket floor.

The first angle 92 may in a range between about 0 degrees and about 10 degrees, and the second angle 94 may in a range between about 1 degree and about 30 degrees. However, in every case, the second angle 94 is greater in magnitude than the first angle 92. In the illustrated embodiment, for example, the first angle 92 may be about 1 degree, and the second angle 94 may about 11 degrees. By selectively adjusting the first and second angles 92, 94 for a particular positive and/or negative style cutting insert, a 90° wall of a workpiece (not shown) can be precisely obtained using both positive and negative style of cutting inserts 25, 25'. As shown in FIGS. 3-5, the support pads 78, 80 and the bottom floor 70 provide a three-point contact between the pocket 20 and the cutting inserts 25, 25' (i.e., the flat surface 64 and two of the mounting surfaces 75a, 75b, 75c, 75d of the cutting inserts 25, 25').

As shown in FIGS. 4 and 5, the first and second walls 78a, 78b, 80a, 80b extend entirely across a length, L, and a height, H, of the support pads 78, 80. As shown in FIG. 5, the first and second wall 80b of the support pad 80 is tapered at an angle 96 with respect to the first wall 80a when viewed in a plane that is parallel to the bottom floor 70 of the pocket 20 (i.e., perpendicular to the axis, A. The taper angle 96 is a result of the composite angle (i.e., the angles 92, 94) of the second planar walls 78b, 80b. Otherwise, the second, planar walls 78b, 80b would not be tapered, but rather would be rectangular in shape. Although not shown in the drawings, it should be realized that the second wall 80b of the support pad 8078 is also tapered in a similar fashion.

Figure 6:
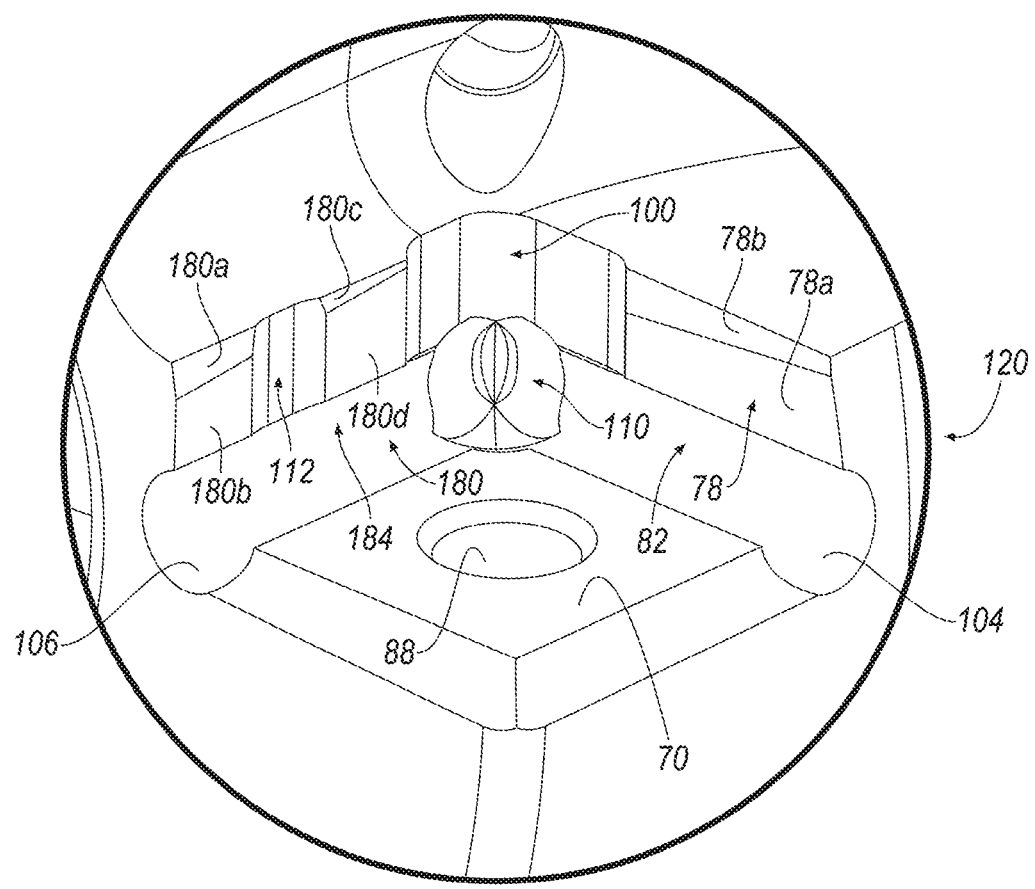
FIG. 6 is a top perspective view of the pocket with at least one support pad having an indentation according to another embodiment of the invention.

Referring now to FIG. 6, a pocket 120 is shown according to another embodiment of the invention. In the illustrated embodiment, the pocket 120 is identical to the pocket 20, except that the support pad 80 extending from the side wall 84 is replaced with a support pad 180 extending from a side wall 184 that includes an indentation 112. The indentation 112 divides the support pad 180 to define a first portion having a first, planar wall 180a, a second, planar wall 180b, and a second portion having a third, planar wall 180c and a fourth, planar wall 180d. By providing the indentation 112, the associated mounting surfaces 75a, 75b, 75c, 75d of the cutting inserts 25, 25' (FIGS. 2A and 2B) will be supported at two predetermined locations on the support pad 180. It should be noted that the indentation 112 is centrally located (i.e., ½ L) and extends the entire height, H, of the support pad 180. It should also be noted that the support pads 78, 180 and the bottom floor 70 provide a four-point contact to the flat surface 64 and the mounting surfaces 75a, 75b, 75c, 75d of the cutting inserts 25, 25'.

Figure 7:
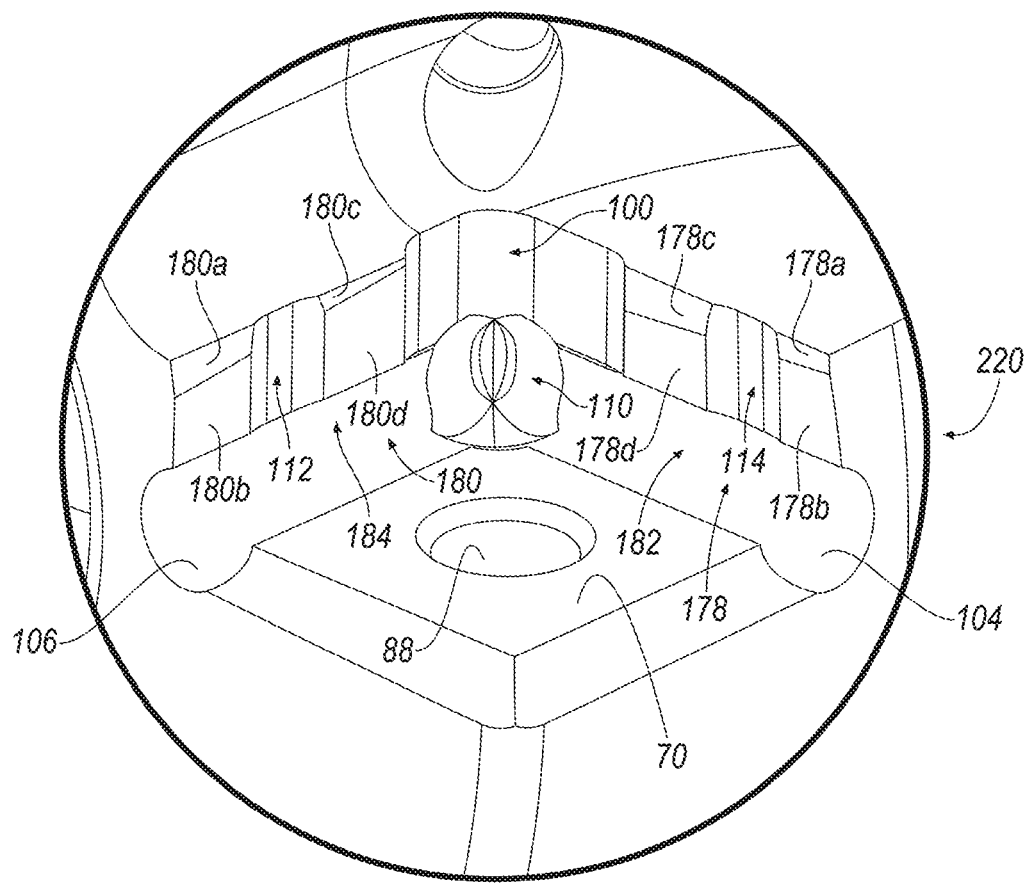
FIG. 7 is a top perspective view of the pocket with both support pads having an indentation according to another embodiment of the invention.

Referring now to FIG. 7, a pocket 220 is shown according to another embodiment of the invention. In the illustrated embodiment, the pocket 220 is identical to the pocket 120, except that the support pad 78 extending from the side wall 82 is replaced with a support pad 178 extending from a side wall 182 that includes an indentation 114, similar to the indentation 112. The indentation 114 divides the support pad 178 into a first portion having a first, planar wall 178a and a second, planar wall 178b, and a second portion having a third, planar wall 178c and a fourth, planar wall 178d. By providing the indentation 114, the associated mounting surfaces 75a, 75b, 75c, 75d of the cutting inserts 25, 25' (FIGS. 2A and 2B) will be supported at two predetermined locations on the support pad 178. It should be noted that the indentation 114 is centrally located (i.e., ½ L) and extends the entire height, H, of the support pad 178. It should be noted that the support pads 178, 180 and the bottom floor 70 provide a five-point contact to the flat surface 64 and the mounting surfaces 75a, 75b, 75c, 75d of the cutting inserts 25, 25'.

As described above, the toolholder 10 of the invention includes one or more pockets 20, 120, 220 having support pads 78, 80, 178, 180 with a first, planar wall and a second, planar wall that are capable of accommodating both a positive style cutting insert and a negative (neutral) style cutting insert, thereby eliminating the need for a separate toolholder for each style of cutting insert. In addition, the magnitude of the angles of the first, planar wall and the second, planar wall with respect to a plane parallel to the pocket floor can be selectively adjusted such that a 90-degree wall can be precisely obtained on the workpiece (not shown) with both styles of cutting inserts being mounted in the toolholder 10 of the invention. Further, the angle of the second, planar wall is composite angle with respect to a plane that is perpendicular to the bottom floor of the pocket for accommodating the clearance angle and the lead angle of a positive style cutting insert.

The patents and other documents identified herein are hereby incorporated by reference herein. Other embodiments of the invention will be apparent to those skilled in the art from a consideration of the specification or a practice of the invention disclosed herein. It is intended that the specification and examples are illustrative only and are not intended to be limiting on the scope of the invention. The true scope and spirit of the invention is indicated by the following claims.

PARTS LIST 10 toolholder
12 body
15 longitudinal axis (toolholder)
17 forward end
20 pocket
25 positive style cutting insert
25' negative style cutting insert
26 insert screw
27 end surface
30 side surface
50a,b,c,d corner (insert)
57 central axis
64 flat surface (insert)
70 pocket floor
75a,b,c,d mounting surface (insert)
78 support pad
   78a first, planar wall
   78b second, planar wall
80 support pad
   80a first, planar wall
   80b second, planar wall
82 first side wall (pocket)
84 second side wall (pocket)
86 pocket corner
88 threaded bore
90 central bore (insert)
92 first angle
94 second angle
96 angle
100 primary deep relief area
104 relief
106 relief
110 primary shallow relief area
112 indentation
114 indentation
120 pocket
178 support pad
   178a first, planar wall
   178b second, planar wall
   178a first, planar wall
   178b second, planar wall
180 support pad
   178a first, planar wall
   178b second, planar wall
   178a first, planar wall
   178b second, planar wall
220 pocket

The invention claimed is:

1. A toolholder, comprising:
a body extending along a longitudinal axis and having a forward end;
a pocket extending into the forward end, wherein the pocket has a first side wall, a second side wall and a bottom floor for accommodating the cutting insert and, wherein the first and second side walls intersect to define a pocket corner; and
a support pad protruding from each of the first and second side walls of the pocket,
wherein each support pad includes a first, planar wall extending entirely across a length (L) of the support pad, and a second, planar wall adjacent the first, planar wall extending entirely across the length (L) of the support pad,
wherein the second, planar wall is a composite angle comprising a first angle defined by rotating a plane (P) perpendicular to the bottom floor about a vertical axis (y-axis) and a second angle defined by tilting the plane (P) about the longitudinal axis, the second angle being different in magnitude than the first angle,
wherein the first, planar wall of each support pad is adapted to accommodate a first cutting insert, and
wherein the second, planar wall of each support pad is adapted to accommodate a second cutting insert having a different clearance angle (CA) than the first cutting insert.

2. The toolholder of claim 1, wherein the second angle is larger in magnitude than the first angle.

3. The toolholder of claim 1, wherein the first angle is 0 degrees, and wherein the second angle is greater than 0 degrees.

4. The toolholder of claim 1, wherein the first cutting insert has a larger clearance angle (CA) than the second cutting insert.

5. The toolholder of claim 1, further comprising a recess adjacent to at least one of the support pads for providing clearance for the cutting insert.

6. The toolholder of claim 1, further comprising a primary deep relief area located within the pocket corner, and a primary shallow relief area located within the pocket corner.

7. A toolholder, comprising:
a body extending along a longitudinal axis and having a forward end;
a pocket extending into the forward end, wherein the pocket has a first side wall, a second side wall and a bottom floor for accommodating the cutting insert and, wherein the first and second side walls intersect to define a pocket corner;
a first support pad extending from the first side wall of the pocket;

a second support pad extending from the second side wall of the pocket, wherein at least one the first and second support pads includes an indentation defining a first, planar wall, a second planar wall, a third, planar wall and a fourth, planar wall, wherein the second, planar wall and the fourth, planar wall are formed at a composite angle comprising a first angle defined by rotating a plane (P) perpendicular to the bottom floor about a vertical axis (y-axis) and a second angle defined by tilting the plane (P) about the longitudinal axis, the second angle being different in magnitude than the first angle, wherein the first, planar wall and the third, planar wall of the at least one support pad are adapted to accommodate a first cutting insert, and wherein the second, planar wall and the fourth, planar wall of the at least one support pad accommodates a second cutting insert having a different clearance angle (CA) than the first cutting insert.

8. The toolholder of claim 7, wherein the first support pad includes the indentation defining the first, planar wall, the second planar wall, the third, planar wall and the fourth, planar wall.

9. The toolholder of claim 7, wherein the second support pad includes the indentation defining the first, planar wall, the second planar wall, the third, planar wall and the fourth, planar wall.

10. The toolholder of claim 7, wherein both the first and second support pads includes the indentation defining the first, planar wall, the second planar wall, the third, planar wall and the fourth, planar wall.

11. The toolholder of claim 7, wherein the indentation is centrally located on the at least one support pad.

12. The toolholder of claim 7, wherein the at least one support pad defines a height (H) and wherein the indentation extends the entire height (H) of the at least one support pad.

13. The toolholder of claim 7, wherein the second angle is larger in magnitude than the first angle.

14. The toolholder of claim 7, wherein the first cutting insert has a larger clearance angle (CA) than the second cutting insert.

15. The toolholder of claim 7, further comprising a recess adjacent to at least one of the support pads for providing clearance for the first and second cutting inserts.

16. The toolholder of claim 7, further comprising a primary deep relief area located within the pocket corner, and a primary shallow relief area located within the pocket corner.

17. The toolholder of claim 1, wherein at least one support pad includes an indentation formed on the first, planar wall and the second, planar wall.

18. The toolholder of claim 17, wherein the indentation is centrally located on the at least one support pad.

19. The toolholder of claim 17, wherein at least one support pad defines a height (H) and wherein the indentation extends the entire height (H) of the at least one support pad.

* * * * *